(12) United States Patent  
Kojima et al.

(10) Patent No.: US 8,105,202 B2
(45) Date of Patent: Jan. 31, 2012

(54) TRANSMISSION CONTROL DEVICE FOR MOTORCYCLE

(75) Inventors: Hiroyuki Kojima, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 778 days.

(21) Appl. No.: 12/024,406

(22) Filed: Feb. 1, 2008

(65) Prior Publication Data

US 2008/0188350 A1   Aug. 7, 2008

(30) Foreign Application Priority Data

Feb. 5, 2007 (JP) ................................. 2007-025408

(51) Int. Cl.
*F16H 59/60* (2006.01)
*F16H 59/62* (2006.01)
(52) U.S. Cl. ........................................................ 477/97
(58) Field of Classification Search .................... 477/97, 477/111, 112, 116; 74/335, 337.5
See application file for complete search history.

(56) References Cited

U.S. PATENT DOCUMENTS

| | | | | |
|---|---|---|---|---|
| 4,869,332 A * | 9/1989 | Fujita et al. | ................ | 180/65.22 |
| 5,795,262 A * | 8/1998 | Robinson | ................ | 477/92 |
| 6,213,911 B1 * | 4/2001 | Salecker et al. | ................ | 477/97 |
| 6,314,801 B1 * | 11/2001 | Reggiardo | ................ | 73/112.01 |
| 7,140,631 B2 * | 11/2006 | Ridley | ................ | 280/301 |
| 7,644,794 B2 * | 1/2010 | Usukura et al. | ................ | 180/219 |
| 2009/0082175 A1 * | 3/2009 | Tsukada et al. | ................ | 477/99 |

FOREIGN PATENT DOCUMENTS

JP   2-133929 U   11/1990
JP   5-32079 U    4/1993

* cited by examiner

*Primary Examiner* — Justin Holmes
(74) *Attorney, Agent, or Firm* — Birch, Stewart, Kolasch & Birch, LLP (57) ABSTRACT

To automatically shift the shift position of an automatic transmission depending on whether or not the rider is seated or the side stand is retracted. When the vehicle is at a stop with an engine running, and it is detected that the rider is not sitting on a rider seat, an automatic transmission is automatically shifted to the neutral range while maintaining the operation of the engine. Further, when the vehicle is at a stop with the engine running, and the automatic transmission has been in the drive range continuously for a predetermined period of time, provided that the rider is not sitting on the rider seat, the automatic transmission is automatically shifted to the neutral range. Further, when, in a state with a side stand retracted, the throttle opening is equal to or smaller than a predetermined opening, the automatic transmission is automatically shifted to the drive range.

20 Claims, 6 Drawing Sheets

TRANSMISSION CONTROL DEVICE FOR MOTORCYCLE

CROSS-REFERENCE TO RELATED APPLICATIONS

The present application claims priority under 35 USC 119 to Japanese Patent Application No. 2007-025408 filed on Feb. 5, 2007 the entire contents of which are hereby incorporated by reference.

BACKGROUND OF THE INVENTION

1. Field of the Invention

The present invention relates to a transmission control device for a motorcycle. More specifically, to a transmission control device for a motorcycle wherein in a motorcycle incorporating an automatic transmission, an automatic gear shifting is effected to permit the starting of the motorcycle only when the rider is seated.

2. Description of Background Art

A control device is known wherein the engine is started on the condition that a rider is sitting on a seat provided to the vehicle. For example, JP-U No. 12-133929 proposes an operational control device for a riding working machine, which stops the engine when an unseated state has continued for a set period of time or more, and maintains the engine in a stopped state until a startup standby state is reached, for example, when the transmission is in the neutral state and a PTO clutch is in a disengaged state. Further, JP-U NO. H5-32079 proposes a shift lever lock device for an automatic transmission, which locks the shift lever in the neutral position when the shift lever is in the neutral position and the rider is not seated on the rider seat.

In the case of the operation control device described in P-U No. 2-133929, the engine is stopped when a set period of time has elapsed after the rider moves away from the vehicle, so it is required to start the engine again every time the vehicle restarts. Further, with the device described in JP-U NO. H5-32079, he shift lever is locked when, for example, a motorcycle is stopped at an intersection by placing the shift lever into the neutral position, and the rider raises himself/herself from the seat. In this case, to restart the motorcycle, it is required to release the lock, and shift the shift lever into the drive range.

SUMMARY AND OBJECTS OF THE INVENTION

It is an object of an embodiment of the present invention to provide a transmission control device for a motorcycle which can simplify the operation performed when restarting a vehicle at rest on the condition that the rider is seated.

To attain the above-mentioned object according to an embodiment of the present invention, when a vehicle is at a stop with the engine running (vehicle speed is equal to or lower than a predetermined value), and it is detected that the rider is not seated, the automatic transmission is automatically shifted to the neutral range while keeping the operation of the engine as it is.

According to an embodiment of the present invention, when the vehicle is at a stop with the engine running (vehicle speed is equal to or lower than a predetermined value), and the automatic transmission has been in the drive range continuously for a set period of time, if the rider is not seated, the automatic transmission is automatically shifted to the neutral range.

According to an embodiment of the present invention, the automatic transmission is automatically shifted to the neutral range when the throttle opening is equal to or smaller than a predetermined opening in a state with the side stand retracted.

According to an embodiment of the present invention, when the rider is not sitting on the seat with the vehicle at a stop, the engine is not stopped, and the automatic transmission is shifted to the neutral range. Therefore, the vehicle can be restarted simply by the rider seating himself/herself on the seat again and shifting the automatic transmission to the drive range.

According to an embodiment of the present invention, even when, for example, the rider forgets to return the automatic transmission from the drive range to the neutral range upon stopping the vehicle, if the rider is seated, the automatic transmission is maintained as it is since it is assumed that the vehicle will restart soon, and if the rider is not seated, it is assumed that the vehicle will not restart soon so that the automatic transmission is automatically shifted to neutral. Therefore, the automatic transmission can be shifted in accordance with the vehicle stop state or seated state, thus achieving enhanced convenience in restarting the vehicle.

According to an embodiment of the present invention, once seating of the rider has been detected and the side stand has been retracted, the automatic transmission is automatically shifted to the drive range, so the vehicle can be easily restarted by simply operating the throttle to open. More specifically, the rider can easily restart the vehicle simply by riding the vehicle, pulling up the side stand, and opening the throttle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
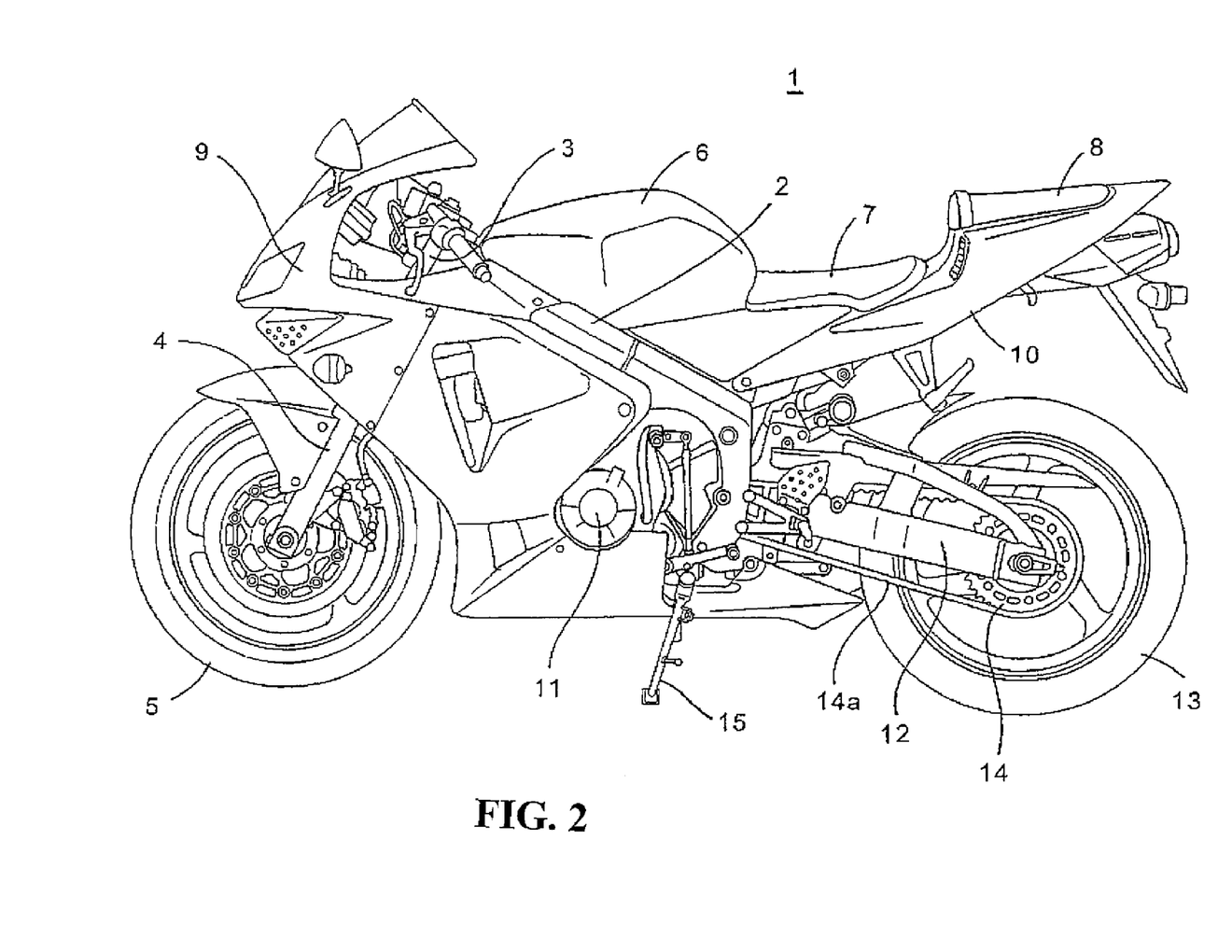
FIG. 2 is a side view of a motorcycle including a transmission control device according to an embodiment of the present invention.

Hereinbelow, an embodiment of the present invention will be described with reference to the drawing. FIG. 2 is a side view of the motorcycle having a hydraulic automatic transmission according to an embodiment of the present invention. A motorcycle 1 has a steering shaft 3 steerably supported on the front portion of a frame body 2. A front wheel 5 is rotatably journaled to the lower end portion of a front fork 4 extending downward from the steering shaft 3. A seat rail (not shown) is connected to the upper rear portion of the frame body 2. A fuel tank 6 is arranged on the frame body 2, and a rider seat 7 and a pillion seat 8 are arranged on the seat rail. The front and side portions of the steering shaft 3, and the front portion of the frame body 2 are covered by a front cowl 9, and the upper and side portions of the seat rail are covered by a rear cowl 10.

An engine 11 is suspended on the frame body 2. A swing arm 12 is pivoted on the rear portion of the frame body 2 so as to be vertically swingable. A rear wheel 13 is supported on the rear end of the swing arm 12. The rear wheel 13 has a driven sprocket 14. A drive chain 14*a* for transmitting the power of the engine 11 to the rear wheel 13 via a transmission (described later) is wrapped around the driven sprocket 14.

Supported on the lower end of the frame body 2 is a side stand 15 provided so as to be capable of projecting downward from and to the side of the body. During traveling of the vehicle, the side stand 15 is pulled up upward along the body to be retracted in a predetermined retracted position.

Figure 1:
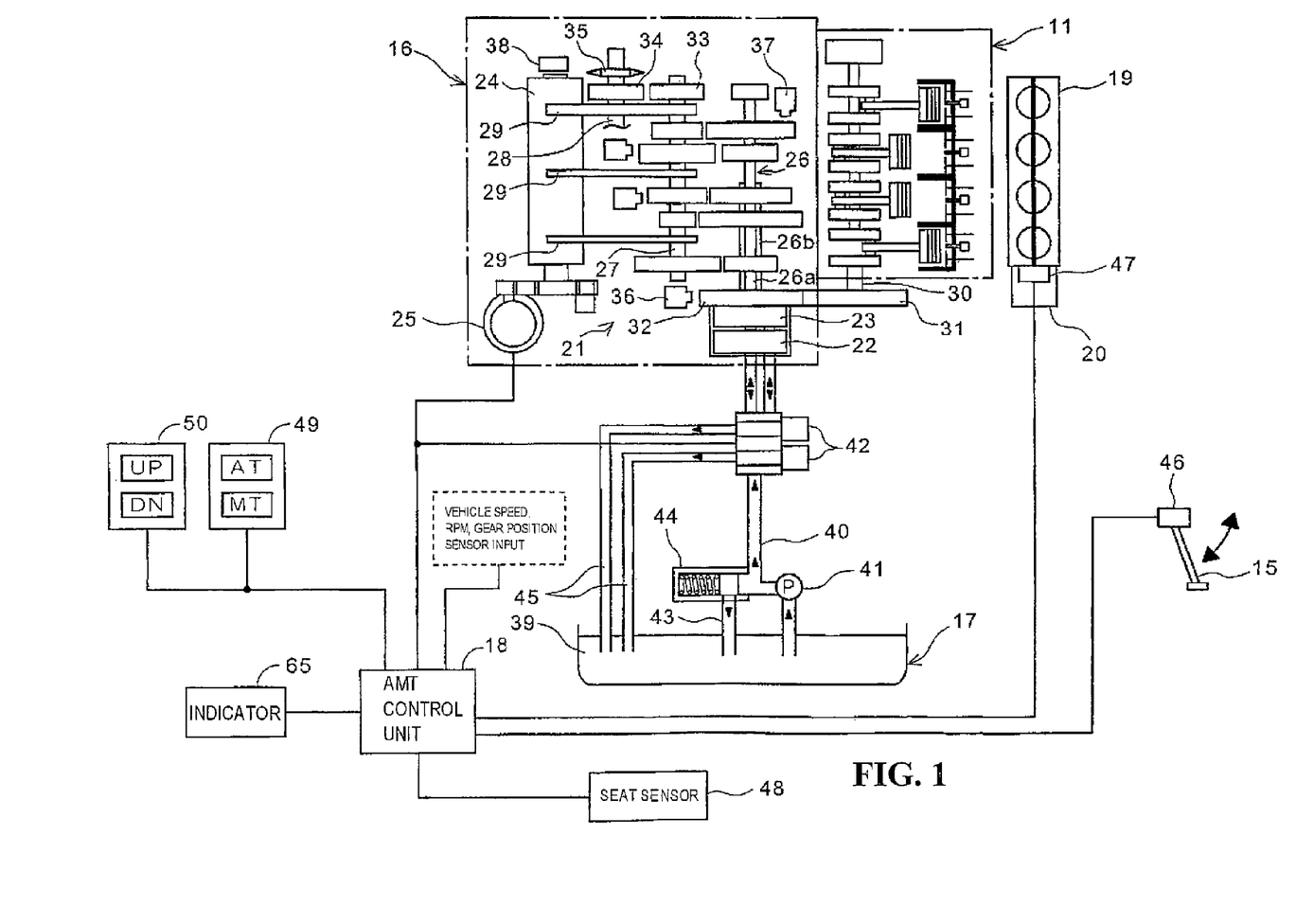
FIG. 1 is a system configuration diagram of a transmission control device according to an embodiment of the present invention.

FIG. 1 is a system configuration diagram of the motorcycle 1. In FIG. 1, the motorcycle 1 has an automatic manual transmission (hereinafter, referred to as the "AMT") 16 connected to the engine 11, a clutch hydraulic system 17, and an AMT control unit 18. The engine 11 has a throttle-by-wire (TBW) throttle body 19. The throttle body 19 includes a motor 20 for throttle opening/closing.

The AMT 16 includes a multistage transmission gear 21, a first clutch 22, a second clutch 23, a shift drum 24, and a shift control motor 25. A large number of gears constituting the transmission gear 21 are coupled or loosely fitted onto a main shaft 26, a countershaft 27, and a transmission gear output shaft 28. The main shaft 26 includes an inner main shaft 26*a* and an outer main shaft 26*b*. The inner main shaft 26*a* is coupled to the first clutch 22, and the outer main shaft 26*b* is coupled to the second clutch 23.

The main shaft 26 and the countershaft 27 are provided with dog clutches (not shown) that are displaceable in the axial directions of the main shaft 26 and countershaft 27, respectively. Ends of a shift fork 29 are respectively engaged with these dog clutches and cam grooves (not shown) formed in the shift drum 24.

A primary drive gear 31 is coupled to an output shaft of the engine 11, that is, a crankshaft 30. The primary drive gear 31 is in mesh with a primary driven gear 32. The primary driven gear 32 is connected to the inner main shaft 26*a* via the first clutch 22, and connected to the outer main shaft 26*b* via the second clutch 23.

A countershaft output gear 33 coupled to the countershaft 27 is in mesh with an output driven gear 34 coupled to the transmission gear output shaft 28. A drive sprocket 35 is coupled to the transmission gear output shaft 28, and the drive sprocket 35 is connected to the driven sprocket 14 of the rear wheel 13 via the drive chain 14*a* shown in FIG. 2.

Within the AMT 16, there are provided an engine rpm sensor 36 opposed to the outer circumference of the primary driven gear 32, a vehicle speed sensor 37 opposed to the outer circumference of a gear coupled to the inner main shaft 26*a* which has undergone primary reduction, and a gear position sensor 38 for detecting the shift position by the shift drum 24.

The clutch hydraulic system 17 has an oil tank 39, and a line 40 for feeding oil in the oil tank 39 to the first clutch 22 and the second clutch 23. A pump 41 and a valve 42 are provided on the line 40, and a regulator 44 is arranged on a return line 43 connected to the line 40. The structure of the valve 42 is such that oil pressure can be individually applied to the first clutch 22 and the second clutch 23. Further, a return line 45 for oil is also provided to the valve 42.

The motorcycle 1 has a side-stand switch 46 that outputs a side-stand detection signal when the side stand 15 is in a predetermined retracted position, a throttle sensor 47 that outputs a throttle opening signal corresponding to the throttle opening of the throttle body 19, and a seat sensor 48 whose output is turned ON when a load equal to or greater than a predetermined value is exerted on the rider seat 7. The seat sensor 48 can be configured by a pressure sensor such as a piezoelectric element received within the rider seat 7.

Connected to the AMT control unit 18 are a mode switch 49 for shifting between automatic transmission (AT) and manual transmission (MT), and a shift select switch 50 for commanding an upshift (UP) or downshift (DN). An indicator 65 for the indication of the shift position being currently selected and for the indication of AT and MT is connected to the AMT control unit 18. The AMT control unit 18 includes a microcomputer (CPU). The AMT control unit 18 operates by a predetermined procedure in accordance with output signals of the various sensors and switches mentioned above, controls the valve 42 and the shift control motor 25, and automatically shifts the transmission gear 21 of the AMT 16 in accordance with such operational states as the vehicle speed V, the engine rpm NE, and the throttle opening θTH.

In this embodiment, the following functions are added to the AMT control unit 18. As a first function, when the rider is not seated on the rider seat 7 in a state with the vehicle stopped (vehicle speed is equal to or lower than a predetermined value), the transmission gear 21 is automatically shifted from the drive range to the neutral range. As a second function, if, in a state with the vehicle stopped, the rider is seated, the side stand 15 is retracted, and the throttle opening is small, the transmission gear 21 is shifted from the neutral range to the drive range.

According to the above-mentioned configuration, in the clutch hydraulic system 17, hydraulic pressure is exerted on the valve 42 due to the pump 41. Hydraulic pressure control is effected by the regulator 44 so that this hydraulic pressure does not exceed an upper limit value. When the valve 42 is opened in response to a command from the AMT control unit 18, hydraulic pressure is applied to the first clutch 22 or the second clutch 23, so the primary driven gear 32 is connected to the inner main shaft 26*a* or the outer main shaft 26*b* via the first clutch 22 or the second clutch 23. When the valve 42 is closed to stop application of hydraulic pressure, the first clutch 22 and the second clutch 23 are urged by built-in return springs (not shown) so as to be disconnected from the inner main shaft 26*a* and the outer main shaft 26*b*.

The shift control motor 25 causes the shift drum 24 to rotate in accordance with a command from the AMT control unit 18. When the shift drum 24 rotates, the shift fork 29 is displaced in the axial direction of the shift drum 24 in accordance with the shape of the cam groove formed in the outer circumference of the shift drum 24, causing the dog clutches to move to change the meshing combination of gears on the countershaft 27 and the main shaft 26, thereby upshifting or downshifting the transmission gear 21.

The AMT control unit 18 performs the automatic control described below when the mode switch 49 has been shifted to "AT". When the mode switch 49 has been shifted to "AT", the first clutch 22 and the second clutch 23 are actuated in accordance with an upshift or downshift operation of the select switch 50, causing the transmission gear 21 to upshift or downshift.

Figure 3:
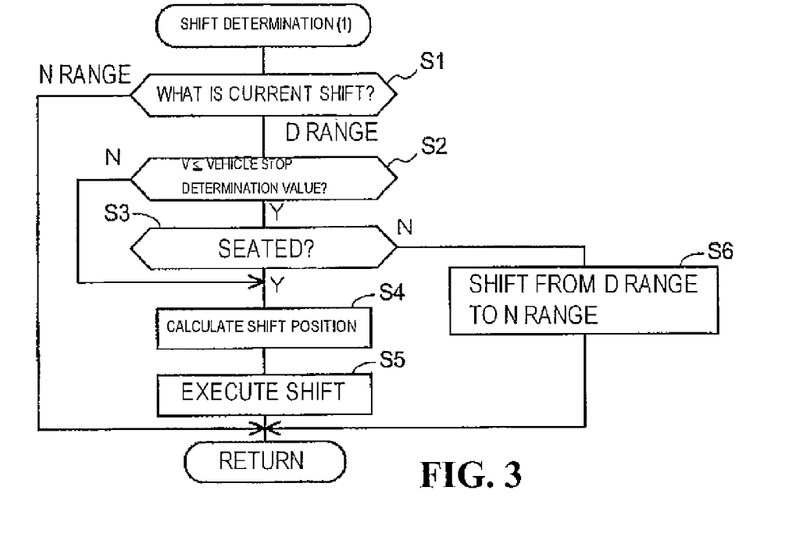
FIG. 3 is a flow chart showing processing corresponding to a first function of a transmission control device according to an embodiment of the present invention.

FIG. 3 is a flow chart showing main processing corresponding to the first function of the AMT control unit 18. It should be noted that the control described below relates to processing preformed after the engine 11 is started. In step S1, it is determined whether the current shift range is the neutral range (N) or the drive range (D). If the current shift range is the drive range, the process proceeds to step S2 where it is determined whether or not the vehicle is at a stop, that is, whether or not the vehicle speed V detected by the vehicle speed sensor 37 is equal to or lower than a reference value for determining whether or not the vehicle is at a stop (vehicle stop determination value (e.g. 2 km per hour)). If it is determined that the vehicle speed V is equal to or lower than the vehicle stop determination value and hence the vehicle is at a stop, the process proceeds to step S3, and whether or not the rider is sitting on the rider seat 7 is determined on the basis of the presence/absence of an ON signal from the seat sensor 48.

If the seating of the rider is detected, the process proceeds to step S4 where the shift position is calculated. The shift position is determined on the basis of the throttle opening, the vehicle speed, the engine rpm, and the like. In step S5, the shift fork 29 is moved to the shift position thus calculated, causing the transmission gear 21 to upshift or downshift. If seating of the rider is not detected, the process proceeds to step S6 where the shift position is shifted from the drive range to the neutral range.

If it is determined in step S2 that the vehicle is not at a stop, the determination as to whether or not the rider is seated is not made, and the process transfers to step S4. In this regard, it is assumed that the rider remains seated when the vehicle is not at a stop, that is, while the vehicle is running. Step S2 is performed to ensure that, although there may be situations where seating of the rider aboard the vehicle is not detected by the seat sensor 48, such as when the rider raises himself/herself from the seat during driving, the shift position is not shifted from the drive range to the neutral range every time this happens. Further, if it is determined in step S1 that the current shift range is the neutral range, steps S2 to S6 are skipped and the processing of this flow chart is terminated.

Figure 4:
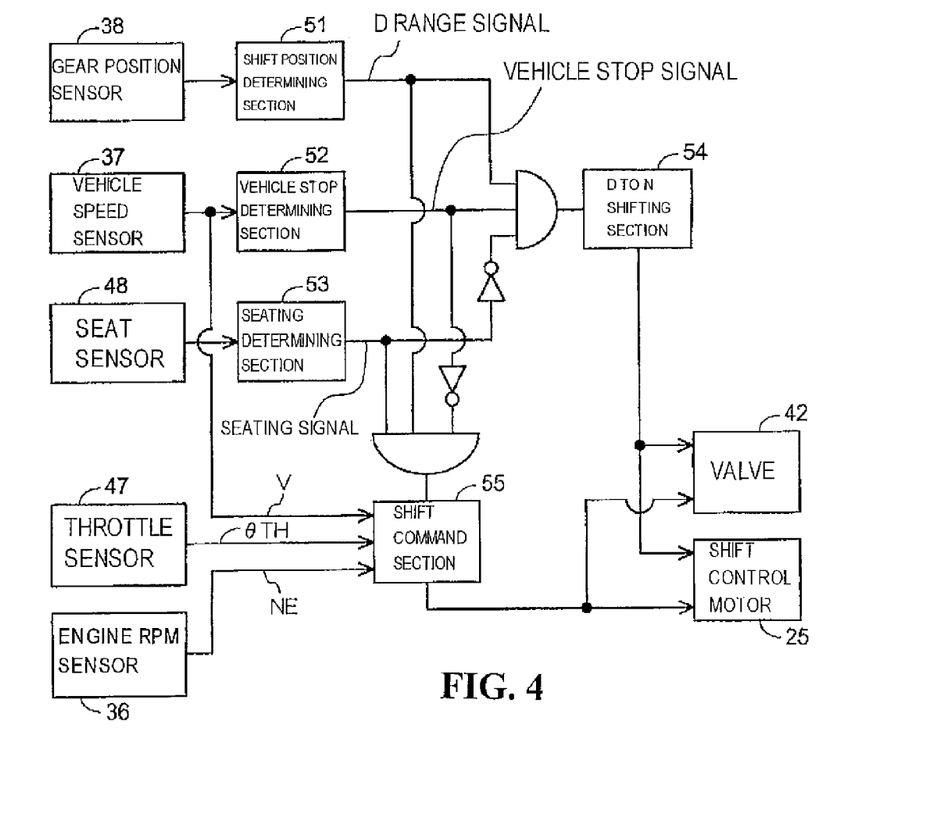
FIG. 4 is a block diagram showing the main portion of a first function.

FIG. 4 is a block diagram showing the main functions of the AMT control unit 18 corresponding to the processing shown in FIG. 3. A shift position determining section 51 determines the current shift range from a detection signal of the gear position sensor 38, and outputs a D range signal when the shift position is in the drive range. A vehicle stop determining section 52 outputs a vehicle stop signal when the vehicle speed V detected by the vehicle speed sensor 37 is equal to or lower than the vehicle stop determination value. A seating determining section 53 outputs a seating signal if an ON signal from the seat sensor 48 is detected.

When the D range signal, the vehicle stop signal, and the seating signal are all inputted, a D-N shifting section 54 inputs a command for shifting the transmission gear 21 to the neutral range to the valve 42 and to the shift control motor. In accordance with the command from the D-N shifting section 54, the valve 42 and the shift control motor 25 shift the first clutch 22 and the third clutch 23, and the transmission gear 21, respectively, to the neutral range, that is, to a neutral state.

When the D range signal, an inverted signal of the vehicle stop signal, and the seating signal are inputted, a shift command section 55 determines the shift position on the basis of the vehicle speed V, the throttle opening θTH, and the engine rpm NE by using a predetermined calculation formula or a function table of vehicle speed, throttle opening, and engine rpm, and inputs a shift position command to the shift control motor 25 and the valve 42. In accordance with the command from the shift command section 55, the first clutch 22 and the third clutch 23, and the transmission gear 21 perform predetermined operations corresponding to the command, thus shifting their shift positions.

Figure 5:
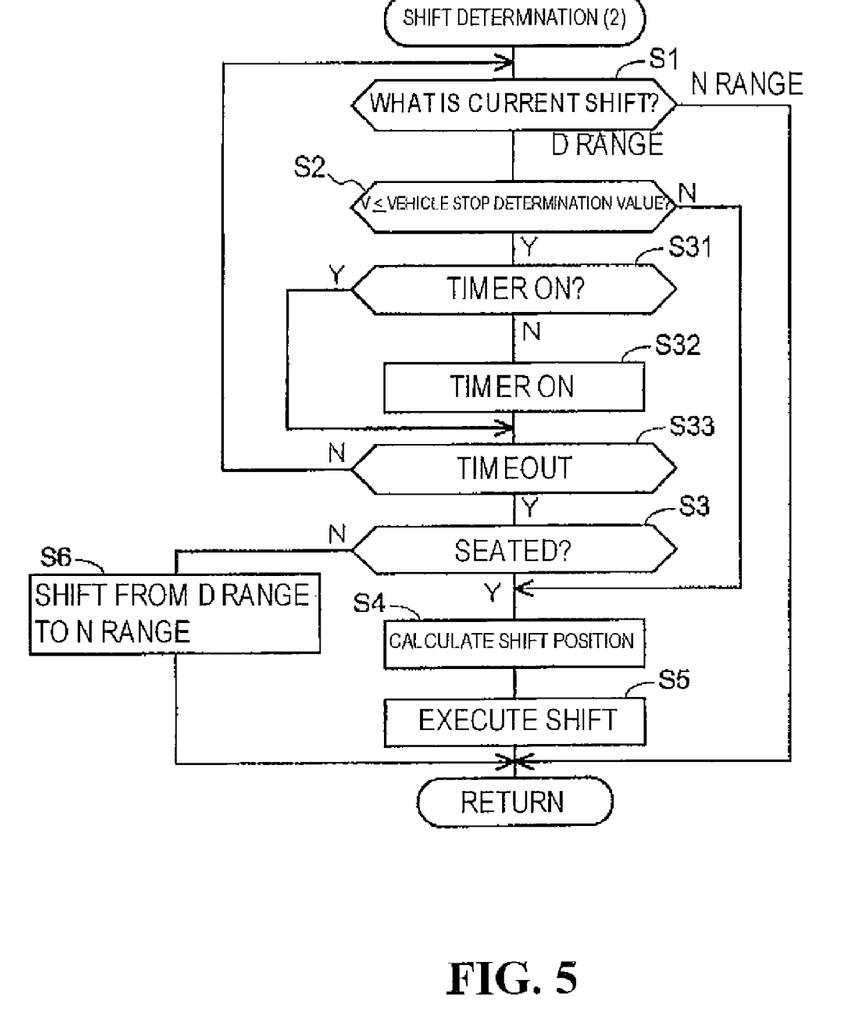
FIG. 5 is a flow chart showing processing corresponding to a modification of a first function.

The above-mentioned function of the AMT control unit 18 may be modified as follows. FIG. 5 is a flow chart showing the main processing of the AMT control unit 18 according to a modification. Symbols that are the same as those of FIG. 3 denote the same processing, and a description thereof is omitted. In the processing shown in FIG. 5, whether or not the rider is seated is determined when a vehicle stop state has continued for a predetermined period of time. Accordingly, if the vehicle is stopped in the drive range for a short period of time, a shift from the drive range to the neutral range is not performed, and if stoppage of the vehicle in the drive range has continued for a predetermined period of time, and seating of the rider is not detected at that point, the drive range is forcibly shifted to the neutral range.

If it is determined in step S2 of FIG. 5 that the vehicle is at a stop, the process proceeds to step S31, and it is determined whether or not a timer is operating (ON). This timer measures the time for which a vehicle stop state has continued. The timer outputs a timeout signal when a predetermined period of time has elapsed. If the timer is not ON, the process proceeds to step S32, and this timer is turned ON. In step S33, it is determined whether or not the timer has timed out. The process returns to step S1 until the timer times out. On the other hand, if the time has timed out, the process proceeds to step S3. If the timer is ON, the process transfers from step S31 to step S33.

The functions shown in FIG. 4 are also modified in accordance with the processing of FIG. 5. That is, a timer function is added to the vehicle stop determining section 52 in FIG. 4, and a vehicle stop signal is outputted from the vehicle stop determining section 52 upon elapse of the time measured by this timer function.

Figure 6:
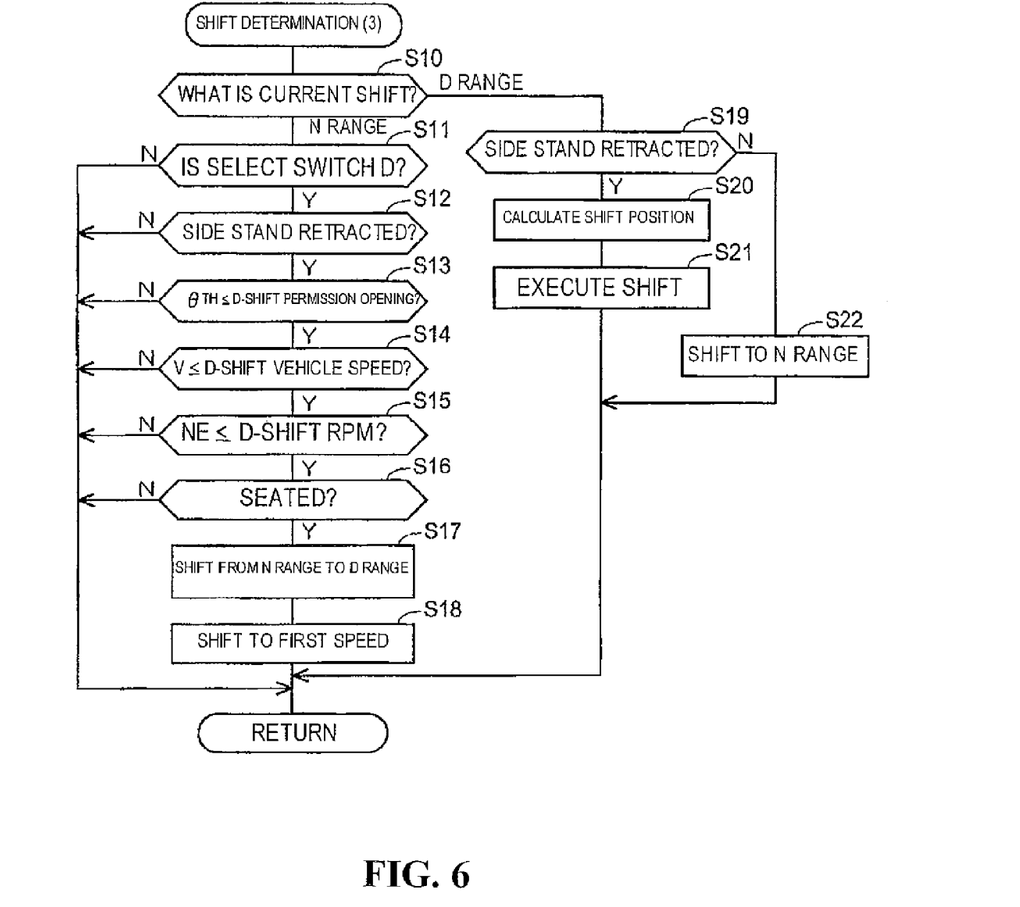
FIG. 6 is a flow chart showing processing corresponding to a second function of a transmission control device according to an embodiment of the present invention.

FIG. 6 is a flow chart showing the main processing corresponding to the second function of the AMT control unit 18. In step S10, it is determined whether or not the current shift range is the neutral range or the drive range. If the current shift range is the neutral range, the process proceeds to step S11 where it is determined whether or not the drive range is being selected by the select switch 50. If the drive range is being selected by the select switch 50, the process proceeds to step S12, and whether or not the side stand 15 is retracted is determined on the basis of the presence/absence of a side stand detection signal. If the side stand 15 is retracted, the process proceeds to step S13, and it is determined whether or not the throttle opening θTH is equal to or larger than a predetermined opening (D-shift permission opening) with reference to which shifting to the drive range is permitted. If the throttle opening θTH is equal to or less than the D-shift permission opening, the process proceeds to step S14.

In step S14, it is determined whether or not the vehicle speed V is equal to or less than a predetermined vehicle speed (D-shift permission vehicle speed) with reference to which shifting to the drive range is permitted. If the vehicle speed V is equal to or less than the D-shift permission vehicle speed and the determination in step S14 is affirmative, the process proceeds to step S15. In step S15, it is determined whether or not the engine rpm NE is equal to or less than a predetermined rpm (D-shift permission rpm) with reference to which shifting to the drive range is permitted. If the engine rpm NE is equal to or less than the D-shift permission rpm, the process proceeds to step S16, and whether or not the rider is seated on the rider seat 7 is determined on the basis of the presence/absence of an ON signal from the seat sensor 48. If an ON signal from the seat sensor 48 is detected, the process proceeds to step S17 where the shift position is shifted from the neutral range to the drive range. Once the shift position has been shifted to the drive range in step S17, the process proceeds to step S18 where the transmission gear is shifted to first speed.

If determination is negative even in one of steps S11 to 16, the subsequent steps are skipped, and shifting from the neutral range to the drive range is not performed.

If it is determined in step S10 that the current shift range is the drive range, the process proceeds to step S19, and it is determined whether or not the side stand 15 is retracted. If the side stand is retracted, the process proceeds from step S19 to step S20 where the shift position is calculated. The shift position is determined on the basis of the throttle opening θTH, the vehicle speed V, the engine rpm NE, and the like. In step S21, the shift fork 29 is moved to the shift position thus calculated, causing the transmission gear 21 to upshift or downshift. If the side stand 15 is not retracted in a predetermined position, the determination in step S19 becomes negative and the process proceeds to step S22, and shifting from the drive range to the neutral range is performed.

Figure 7:
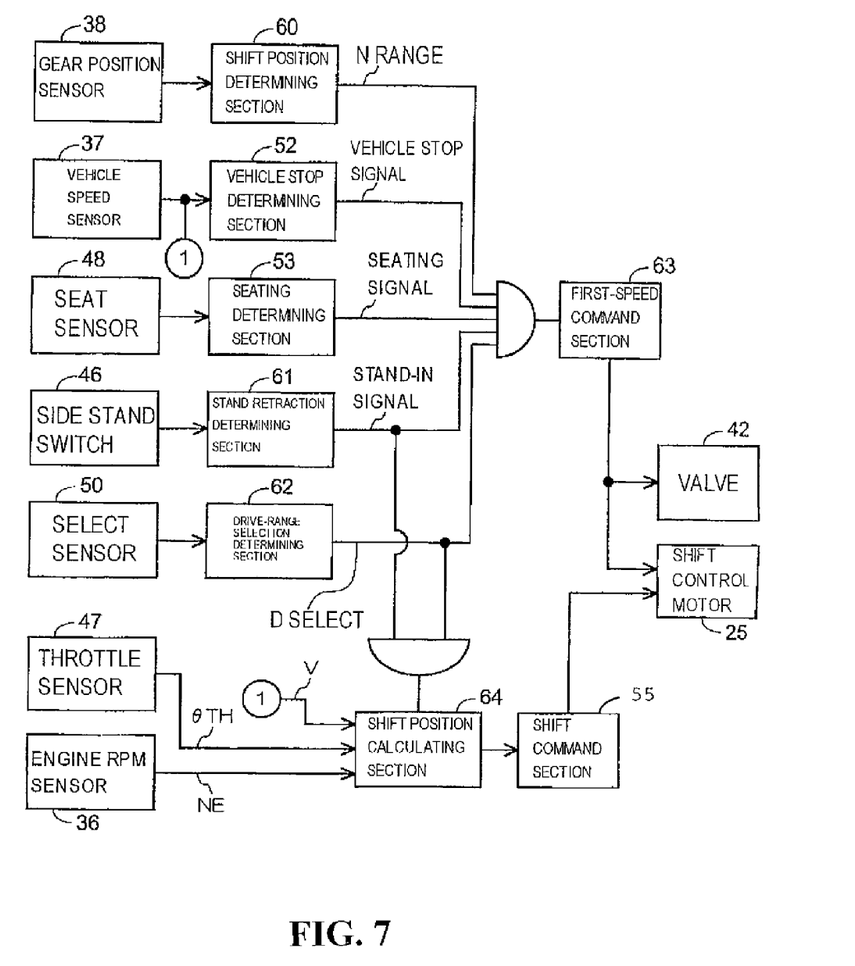
FIG. 7 is a block diagram showing the main portion of a second function.

FIG. 7 is a block diagram showing the main processing of the AMT control unit 18 corresponding to the processing shown in FIG. 6. Symbols that are the same as those of FIG. 4 denote the same processing, and a description thereof is omitted. A shift position determining section 60 determines the current shift position on the basis of a detection signal of the gear position sensor 38, and outputs an N-range signal if the shift position is in the neutral range. A stand retraction determining section 61 outputs a stand-in signal in response to a stand detection signal from the side stand switch 46. A drive-range selection section 62 outputs a D select signal when the drive range is being selected by the select switch 50. A first-speed command section 63 outputs a first-speed command signal when all of the N-range signal, vehicle stop signal, seating signal, stand-in signal, and D select signal are inputted. The valve 42 actuates the first clutch 22 and the second clutch 23 in response to the first-speed command signal, and the shift control motor 25 causes the shift drum 24 to rotate to thereby shift the transmission gear 21 to first speed.

A shift position calculating section 64 calculates the shift position on the basis of the vehicle speed V, the throttle opening θTH, and the engine rpm NE. The calculation result is inputted to a shift command section 65 at the time when the stand-in signal and the D select signal are inputted. In accordance with the shift position thus calculated, the shift command section 65 inputs a shift command for actuating the valve 42 and the shift control motor 25 to the valve 42 and to the shift control motor 25.

In the above-mentioned embodiment, in any case, shifting to the drive range is prohibited if the rider is not sitting on the rider seat 7 when the vehicle is at a stop. On the other hand, if, when the vehicle is at a stop, the drive range is selected by the select switch 50, and the rider is sitting on the rider seat 7, the transmission gear 21 is shifted to the drive range on the precondition that the side stand 15 is retracted and the throttle opening is small.

While the description of this embodiment is directed to a motorcycle using AMT as an automatic transmission, the present invention is not limited to this. For example, shift position shifting determination can be performed in the same manner also when a continuously variable transmission (CVT) is used as an automatic transmission instead of AMT.

Further, the shift position may not necessarily be calculated on the basis of the vehicle speed, the engine rpm, and the throttle opening. For example, the shift position may be determined in accordance with the operating states of the engine, such as the vehicle acceleration and the engine temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission control device for a motorcycle for determining a shift position of an automatic transmission, comprising:
   a vehicle speed sensor;
   a seat sensor for detecting when a rider sits on a rider seat; and
   shift means for automatically shifting the automatic transmission to a neutral range when, after start of an engine, a vehicle stop state is detected on the basis of an output of the vehicle speed sensor and it is detected that the rider is not sitting on the rider seat; and
   an automatic transmission control unit operatively connected to said automatic transmission, said seat sensor being operatively connected to said automatic transmission control unit for detecting when the rider is not sitting on the rider seat for sending a signal to shift the automatic transmission to the neutral range.

2. The transmission control device for a motorcycle according to claim 1, wherein said vehicle speed sensor is operatively connected to said automatic transmission control unit for providing input relative to the vehicle speed.

3. The transmission control device for a motorcycle according to claim 1, wherein said shift means includes a clutch hydraulic system operatively connected to said automatic transmission control unit for responding to a command from said automatic transmission control unit for activating or deactivating said automatic transmission.

4. The transmission control device for a motorcycle according to claim 1, and further including a stand retraction determining means for detecting a position of a side stand in a retracted state, said stand retraction determining means being operatively connected to said automatic transmission control unit for inputting a signal thereto based on the position of the side stand.

5. The transmission control device for a motorcycle according to claim 4, wherein when the side stand is in an extended state for supporting the motorcycle, the rider is seated on the rider seat and the engine is started, the automatic transmission control unit actuates the automatic transmission to be initially in the neutral range.

6. The transmission control device for a motorcycle according to claim 4, wherein when the side stand is in the retracted state and the rider is seated on the rider seat, the automatic transmission control unit permits actuation of the automatic transmission.

7. The transmission control device for a motorcycle according to claim 1, wherein the shift means automatically shifts the automatic transmission to the neutral range when, after start of the engine, the vehicle stop state is detected on the basis of the output of the vehicle speed sensor, and the automatic transmission has been in the drive range continuously for a predetermined period of time, on the condition that the rider is not sitting on the rider seat.

8. The transmission control device for a motorcycle according to claim 1, wherein the shift means does not shift the automatic transmission from a driving range to the neutral range when the vehicle speed sensor detects that a speed of the motorcycle is higher than the vehicle stop state, regardless of whether it is detected that the rider is not sitting on the rider seat.

9. A transmission control device for a motorcycle for determining a shift position of an automatic transmission, comprising:

a vehicle speed sensor;

a seat sensor for detecting when a rider sits on a rider seat;

shift position detecting means for detecting a current shift position of the automatic transmission; and shift means for automatically shifting the automatic transmission to a neutral range when, after start of an engine, a vehicle stop state is detected on the basis of an output of the vehicle speed sensor, and the automatic transmission has been in a drive range continuously for a predetermined period of time, on a condition that the rider is not sitting on the rider seat; and an automatic transmission control unit operatively connected to said automatic transmission, said seat sensor being operatively connected to said automatic transmission control unit for detecting when the rider is not sitting on the rider seat for sending a signal to shift the automatic transmission to the neutral range.

10. The transmission control device for a motorcycle according to claim 9, wherein said vehicle speed sensor is operatively connected to said automatic transmission control unit for providing input relative to the vehicle speed.

11. The transmission control device for a motorcycle according to claim 9, wherein said shift means includes a clutch hydraulic system operatively connected to said automatic transmission control unit for responding to a command from said automatic transmission control unit for activating or deactivating said automatic transmission.

12. The transmission control device for a motorcycle according to claim 9, and further including a stand retraction determining means for detecting a position of a side stand in a retracted state, said stand retraction determining means being operatively connected to said automatic transmission control unit for inputting a signal thereto based on the position of the side stand.

13. The transmission control device for a motorcycle according to claim 12, wherein when the side stand is in an extended state for supporting the motorcycle, the rider is seated on the rider seat and the engine is started, the automatic transmission control unit actuates the automatic transmission to be initially in the neutral range.

14. The transmission control device for a motorcycle according to claim 12, wherein when the side stand is in the retracted state and the rider is seated on the rider seat, the automatic transmission control unit permits actuation of the automatic transmission.

15. A transmission control device for a motorcycle for determining a shift position of an automatic transmission, comprising:

a vehicle speed sensor;

a seat sensor for detecting when a rider sits on a rider seat;

shift position detecting means for detecting a current shift position of the automatic transmission;

stand retraction determining means for detecting that a side stand is retracted in a predetermined retracted position;

a throttle opening sensor for detecting a throttle opening; and shift means for automatically shifting the automatic transmission to a drive range based on whether the side stand is in a retracted state and whether the throttle opening is smaller than a predetermined opening, wherein the shift means does not start to shift the automatic transmission from the neutral range to the drive range after start of the engine unless the side stand is in the retracted state and the throttle opening is smaller than the predetermined opening; and an automatic transmission control unit operatively connected to said automatic transmission, said seat sensor being operatively connected to said automatic transmission control unit for detecting when the rider is not sitting on the rider seat for sending a signal to shift the automatic transmission to the neutral range.

16. The transmission control device for a motorcycle according to claim 15, wherein said vehicle speed sensor is operatively connected to said automatic transmission control unit for providing input relative to the vehicle speed.

17. The transmission control device for a motorcycle according to claim 15, wherein said shift means includes a clutch hydraulic system operatively connected to said automatic transmission control unit for responding to a command from said automatic transmission control unit for activating or deactivating said automatic transmission.

18. The transmission control device for a motorcycle according to claim 15, wherein when the side stand is in an extended state for supporting the motorcycle, the rider is seated on the rider seat and the engine is started, the automatic transmission control unit actuates the automatic transmission to be initially in the neutral range.

19. The transmission control device for a motorcycle according to claim 15, wherein when the side stand is in the retracted state in the predetermined retracted position and the rider is seated on the rider seat, the automatic transmission control unit permits actuation of the automatic transmission.

20. The transmission control device for a motorcycle according to claim 15, wherein the shift means does not shift the automatic transmission from a driving range to the neutral range when the vehicle speed sensor detects that a speed of the motorcycle is higher than the vehicle stop state, regardless of whether it is detected that the rider is not sitting on the rider seat.

* * * * *